US009136024B2

(12) United States Patent
    Diller (10) Patent No.: US 9,136,024 B2
(45) Date of Patent: Sep. 15, 2015

(54) TIE PLATE WITH VARIABLE ORIFICE AND METHODS FOR SELECTIVE CONTROL OF FUEL ASSEMBLY COOLANT FLOW

(75) Inventor: Peter Ray Diller, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 1038 days.

(21) Appl. No.: 12/980,118

(22) Filed: Dec. 28, 2010

(65) Prior Publication Data

US 2012/0163524 A1     Jun. 28, 2012

(51) Int. Cl.
    *G21C 7/06*     (2006.01)
    *G21C 3/33*     (2006.01)
    *G21C 3/322*    (2006.01)
    *G21C 15/24*    (2006.01)
    G21C 1/08      (2006.01)
    G21C 1/32      (2006.01)

(52) U.S. Cl.
    CPC .............. *G21C 3/3305* (2013.01); *G21C 3/322* (2013.01); *G21C 15/24* (2013.01); *G21C 1/086* (2013.01); *G21C 1/322* (2013.01); *Y02E 30/32* (2013.01); *Y02E 30/38* (2013.01); *Y02E 30/39* (2013.01)

(58) Field of Classification Search
    CPC .......... G01D 3/14; G21C 15/24; G21C 1/086; G21C 1/322; G21C 7/08; Y02E 30/32; Y02E 30/39
    USPC ....................................................... 376/210
    See application file for complete search history.

(56) References Cited

U.S. PATENT DOCUMENTS

| 3,053,746 A | 9/1962 | Challender et al. |
| 3,567,582 A | 3/1971 | Van Dievoet et al. |
| 3,892,625 A | 7/1975 | Patterson |
| 3,976,542 A | 8/1976 | Fortescue |
| 4,032,398 A | 6/1977 | Cross et al. |

(Continued)

FOREIGN PATENT DOCUMENTS

| JP | S5267483 A  | 6/1977 |
| JP | S55136995 A | 10/1980 |

(Continued)

OTHER PUBLICATIONS

Unofficial English translation of a JP Office Action dated Jan. 28, 2014, issued in connection with corresponding JP Patent Application No. 2012-016513.

(Continued)

*Primary Examiner* — Frank J McGue
(74) *Attorney, Agent, or Firm* — Parks Wood LLC; Stephen J. Terrell (57) ABSTRACT

In a nuclear reactor core, a lower tie plate assembly is provided with asymmetric features designed to control or vary a loss coefficient as a function of rotation of the associated fuel assembly. An associated method is provided to control the flow of coolant through the associated fuel assembly via rotation of the fuel assembly relative to the fuel support member. Control of the flow can be used to adjust assembly flow rate, assembly power and flow quality within the fuel assembly, among other assembly operational characteristics. Such flow control will impact the flow through other assemblies as well, since core flow remains generally fixed. On a core-wide basis, such flow control can be used to optimize core wide parameters. Optimization parameters of particular interest are the fuel cycle cost and moisture carryover.

13 Claims, 8 Drawing Sheets

(56) References Cited

U.S. PATENT DOCUMENTS

| | | | |
|---|---|---|---|
| 4,175,582 A * | 11/1979 | Ashdown et al. | 137/334 |
| 4,654,194 A | 3/1987 | Christiansen et al. | |
| 4,762,676 A | 8/1988 | Gjertsen et al. | |
| 5,164,150 A * | 11/1992 | Matzner | 376/210 |
| 5,167,911 A | 12/1992 | Fujimura et al. | |
| 5,171,522 A * | 12/1992 | Fennern | 376/444 |
| 5,192,496 A * | 3/1993 | Soneda et al. | 376/428 |
| 5,727,040 A | 3/1998 | Lippert et al. | |
| 7,577,230 B2 * | 8/2009 | Aktas et al. | 376/453 |
| 2003/0018533 A1 | 1/2003 | Klein | |

FOREIGN PATENT DOCUMENTS

| | | |
|---|---|---|
| JP | 0755973 A | 3/1995 |
| JP | 2005201714 A | 7/2005 |

OTHER PUBLICATIONS

Unofficial English translation of Japanese Office Action issued in connection with corresponding JP Application No. 2012-016513 on Dec. 2, 2014.

* cited by examiner

Fig. 1

Fig_3

Fig_6

(PRIOR ART)

Fig. 7

Fig_8  Fig_9

Fig_10

FIG. 11

TIE PLATE WITH VARIABLE ORIFICE AND METHODS FOR SELECTIVE CONTROL OF FUEL ASSEMBLY COOLANT FLOW

TECHNICAL FIELD

The technical field is generally nuclear reactors and, more specifically, systems and methods for selectively and variably controlling coolant flow through a fuel assembly

BACKGROUND

A nuclear reactor core, and in particular a boiling water reactor, includes a plurality of individual fuel assemblies that have different characteristics that affect the strategy for operation of the core. The use of coolant in the core also affects the strategy for operation of the core. Coolant is introduced in the core to cool the core, to be transitioned into steam as a working fluid for energy generation, and to provide thermal neutron source aid in the nuclear reaction.

Fuel support members support the lower end of the fuel assemblies and provide a flow path for coolant to enter the lower end of the fuel assemblies. For most fuel assemblies, the flow path proceeds vertically and upward as it approaches a fuel support member. The coolant then flows horizontally into a side entry inlet orifice for entry into the fuel support member, then vertically and upward again for the approach to the fuel assembly. The flow path in this final approach to the most of the fuel assemblies is not symmetric with respect to the fuel assembly flow path. In fact, only some peripheral fuel assemblies experience symmetric flow through the fuel support member and into the fuel assembly. The flow enters the fuel assembly through the lower tie plate, which supports fuel rods and is also shaped to facilitate seating of the fuel assembly into the fuel support member.

One of the key design considerations for a fuel assembly is the minimum critical power ratio (MCPR), which is a limit selected to protect the fuel assembly from undergoing a boiling transition, which would expose the fuel assembly to excessive temperature. The MCPR is directly related to the flow quality, which is a positive linear function of the fuel assembly power divided by fuel assembly flow rate. High power fuel assemblies require more flow to maintain the same MCPR but, with current side entry inlet orifice layouts, generally receive less flow than the average fuel assembly. This is because the interior fuel support members have the same inlet orifice size, and thus the same loss coefficient. High power fuel assemblies produce more steam, which increases the fuel assembly pressure losses and reduces the flow relative to the average fuel assembly. Consequently, high power fuel assemblies produce especially high quality flow, while low power fuel assemblies produce especially low quality flow.

The fuel support members include an inlet orifice to control coolant distribution between the fuel assemblies and to assist in thermal-hydraulic stability performance of the reactor core. Generally, the inlet orifices of fuel support members were designed at the time of reactor construction to have loss coefficients optimized for then-existing modes of core operation and fuel designs. There have since been changes in fuel designs and core operation, and the orifices are no longer optimized for current fuel assembly designs and/or core operation. Generally, there are two orifice loss coefficients: a high loss coefficient for the fuel assemblies around the periphery of the core and a lower one for all other fuel assemblies. As the fuel assemblies on the periphery of the core have significant neutron leakage, the power in these fuel assemblies is relatively low. The flow to these assemblies is reduced due to orificing, but not sufficiently reduced for current fuel assembly designs and core operation.

The non-uniform exit quality distribution combined with lower values of average exit quality due to non-optimum orificing reduces the capability for reactor systems such as steam separators and dryers to operate effectively. This results in higher amounts of moisture carryover to the turbine, which causes increased erosion damage to turbine blades and steam cycle piping. Erosion damage is costly as it impacts operational life of the affected components and reduces efficiency of the plant's thermodynamic cycle. The moisture also carries small, irradiated particles that collect in various locations of the turbine system. These particles become the sources of higher radiation exposure in the balance of the plant.

Additionally, non-optimum orificing incurs a higher fuel cycle cost. As noted above, high power fuel assemblies are significantly more limiting than other fuel assemblies in terms of MCPR. This limitation translates into non-optimal fuel assembly design and reactor operating conditions in order to comply with the MCPR limits.

Previous attempts to address these problems involve changing the design of the fuel support member. However, the fuel support members are typically installed when the reactors are built and are not easily replaced. Moreover, design changes such as replacing members are relatively permanent, and provide a static adjustment to loss coefficient. As such, permanent modifications do not facilitate customized and adjustable core control strategy planning and implementation. Accordingly, there is a need for a dynamic solution to the problem of control of coolant flow through fuel assemblies.

SUMMARY

The various embodiments provide systems and methods for varying the loss coefficient by reconfiguring the cross-sectional flow geometry of the flow into a fuel assembly, thereby selectively controlling coolant flow through a lower tie plate. The systems and methods facilitate optimization of loss coefficients for different fuel assembly designs and/or core operation strategies. As such, the systems and methods can optimize or customize flow and power output, provide more uniform exit quality distribution, provide lower average exit quality, improve MCPR performance by forcing flow to high power fuel assemblies, reduce both fuel cycle costs and reactor system costs, combinations thereof, and the like.

Generally, the exemplary environment is in the context of a boiling water reactor (BWR) core control strategy that involves optimizing the flow of coolant through fuel assemblies, based on actual or desired characteristics of the fuel assemblies, such as uranium enrichment, gadolinium concentration, power level, exit quality, exposure level, presence in a control cell, and position in the overall arrangement of fuel assemblies in the reactor core. Such characteristics may constitute critical parameters for optimizing the core strategy by controlling the critical parameters to a predefined acceptable range.

The teachings of the present invention can be applied in concert with conventional or yet to be developed control cell core (CCC) strategy wherein, for example, low reactivity fuel assemblies are placed adjacent to control blades that are inserted and distributed in a purposeful arrangement within the overall layout of the core.

According to one aspect, any core strategy can be further optimized using the systems and methods described herein, by selectively varying the coolant flow through specific fuel assemblies, thereby achieving an overall core strategy that is customized to the actual parameters that are applicable to the fuel assemblies that are present in the reactor core.

To achieve such optimization, in certain embodiments, a lower tie plate of a fuel assembly is configured to provide different loss coefficients upon rotation of the fuel assembly relative to a side entry inlet orifice formed in a fuel support member. More specifically, a rotatable damper is disposed between the inlet orifice and an inlet nozzle of the fuel assembly. In the open position, the primary flow area through the lower tie plate is essentially unobstructed by the damper, as its flow geometry is maintained substantially at status quo. By rotating the fuel assembly, the damper can be positioned to partially obstruct the primary flow path. By doing so, the flow is diverted along a more obstructed path, yielding a higher associated loss coefficient.

The damper may be configured and positioned to coordinate with the existing geometry of the fuel support member so as to create sufficient variability to fine tune the performance of individual fuel assemblies. In certain of these embodiments, for example, the damper encloses approximately one third of typical inlet orifice area, and the fuel assembly can be rotated to four positions (unrotated, rotated 90 degrees, 180 degrees or 270 degrees), each yielding a different flow geometry that produces a different loss coefficient. It is contemplated that the shape and size of the damper can be as needed to achieve four unique loss coefficients.

According to an exemplary method, the flow is optimized by rotating at least one fuel assembly in a reactor core layout relative to the side entry inlet orifice of the fuel support member that supports the fuel assembly, to adjust the flow geometry as coolant enters the lower tie plate of the fuel assembly.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DETAILED DESCRIPTION

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Generally described, the disclosure teaches systems and methods for controlling loss coefficients related to a fuel support member and a fuel assembly. The loss coefficient is controlled as a function of a rotation angle of the fuel assembly relative to the fuel support member (for example, relative to the entry orifice of the fuel support member). The systems and methods can be used to control loss coefficients throughout the boiling water reactor to optimize fuel cycle cost, flow distribution, flow rates, fuel assembly power, fuel assembly axial power distribution, plutonium utilization, exit quality distribution, average exit quality, minimum critical power ratio performance, reactor system costs, combinations thereof, and the like. Although, the embodiments are generally described herein with respect to loss coefficients, it should be understood that such systems and methods can similarly be applied to control flow rate, pressure loss, minimum critical power ratio, and the like.

Figure 1:
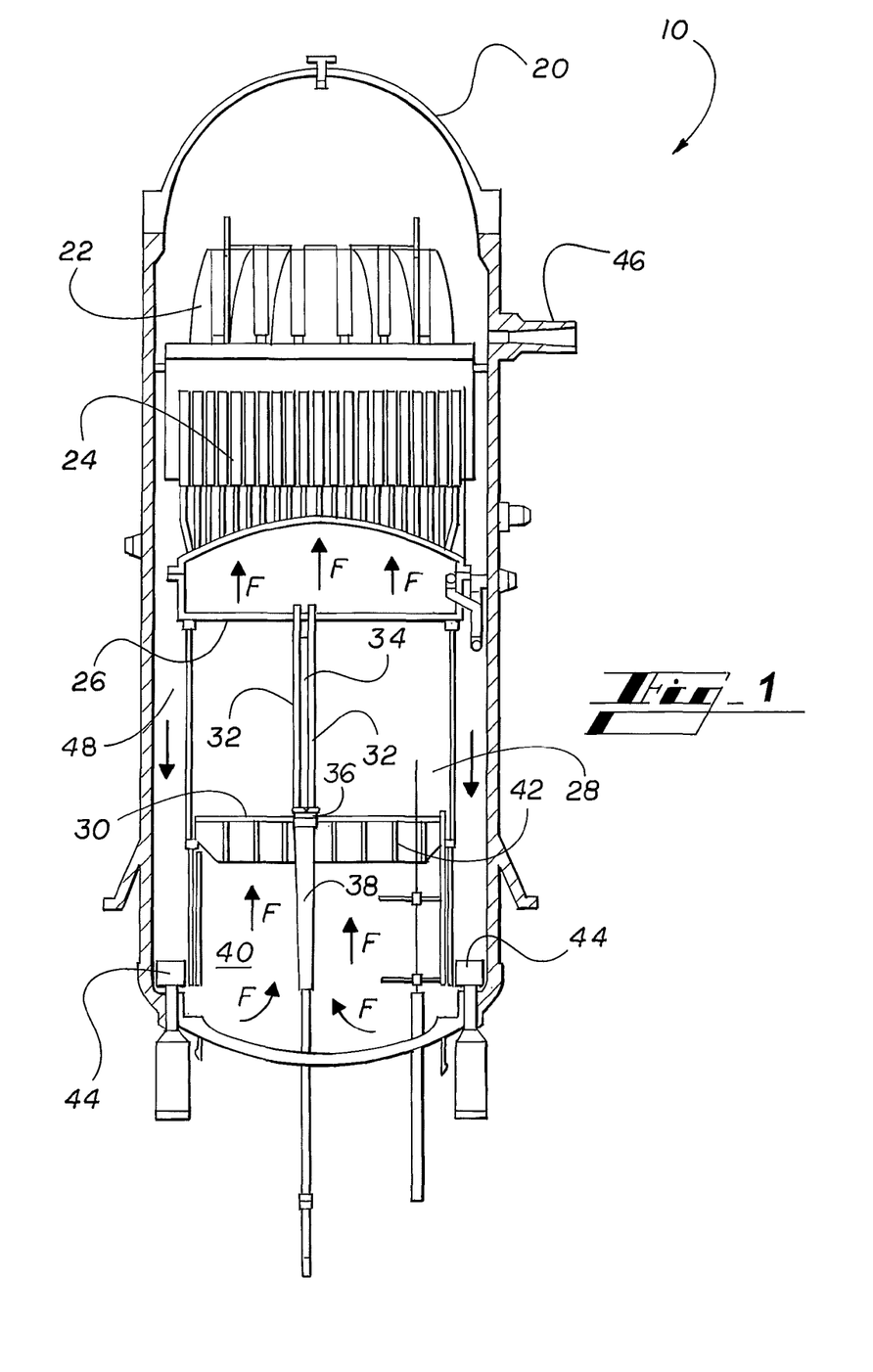
FIG. 1 is a schematic cross-sectional view illustrating the structure of a reactor pressure vessel in accordance with an exemplary environment of the invention.

Referring to FIG. 1, the general structure of a boiling water reactor (BWR) 10 is illustrated. The BWR 10 includes a reactor pressure vessel 20, a steam dryer 22, a steam separator 24, a top guide 26, a core shroud 28, a core support plate 30, fuel assemblies 32, control rods 34, fuel support members 36, control rod guide tubes 38, a lower plenum 40, reinforcing beams 42, recirculation pumps 44, and main steam lines 46.

Pressure is generated in the lower plenum 40 by the recirculation pumps 44 such that coolant (e.g., water) flows from the lower plenum 40 through the fuel support members 36 into the fuel assemblies 32. In the fuel assemblies 32, the coolant is heated to produce a two-phase flow including vapor and liquid components. The vapor and liquid components are separated by reactor systems including steam separators 24 and the steam dryer 22. For example, liquid is separated from vapor by the steam separator 24, with the liquid returned to an annulus (downcomer) 48 and then to the recirculation pumps 44, and the vapor (with a small amount of residual liquid) directed into the steam dryer 22. The remaining liquid is separated from the vapor by the steam dryer 22, again with the liquid returned to the downcomer 48, and the vapor directed into a turbine (not shown) through main steam lines 46. At this point the steam contains very little liquid, on the order of 0.1% by weight.

Figure 2:
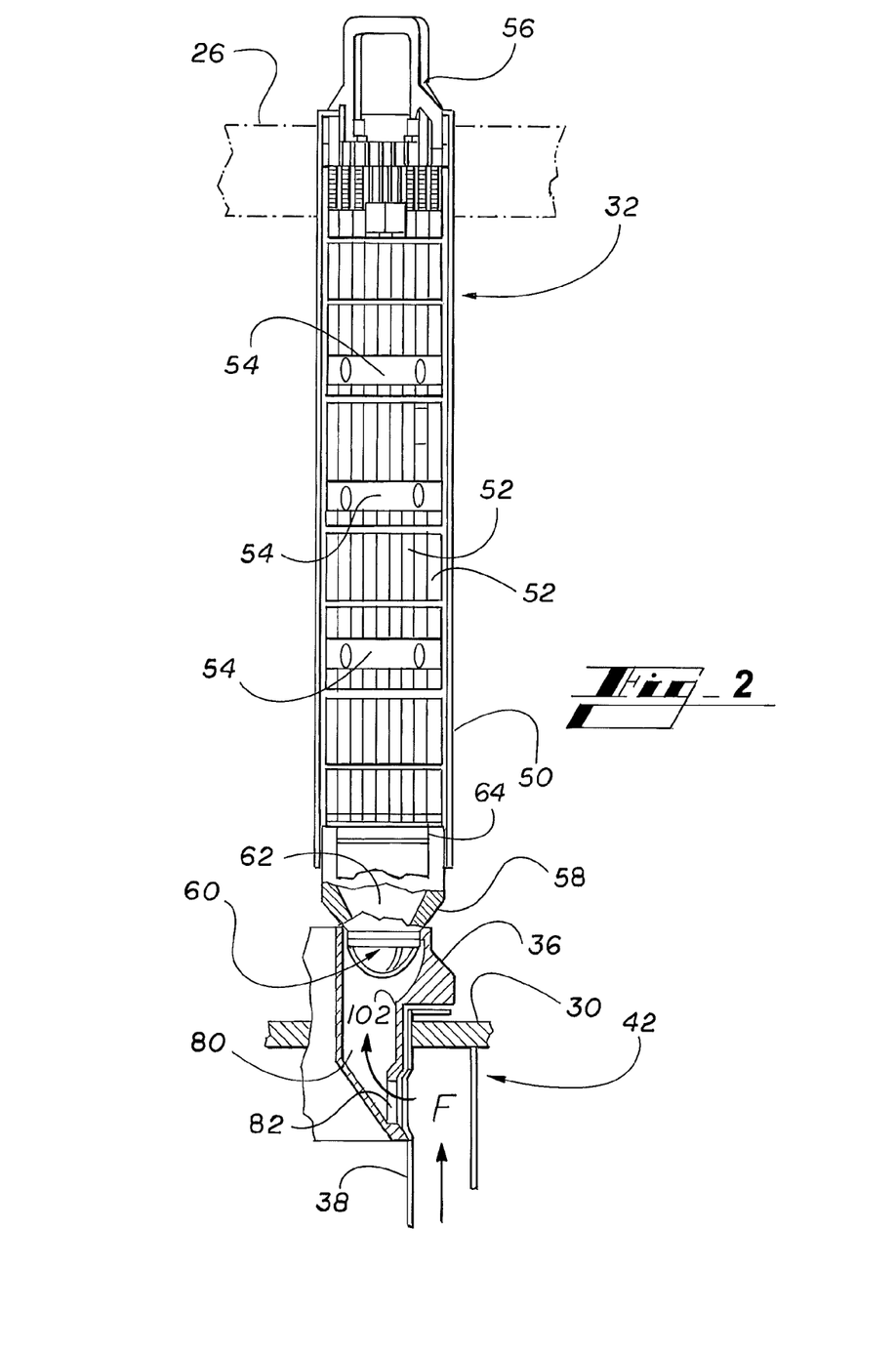
FIGS. 2 and 3 are partial cross-sectional elevation views illustrating a fuel assembly and a fuel support member of the reactor of FIG. 1.
Figure 3:
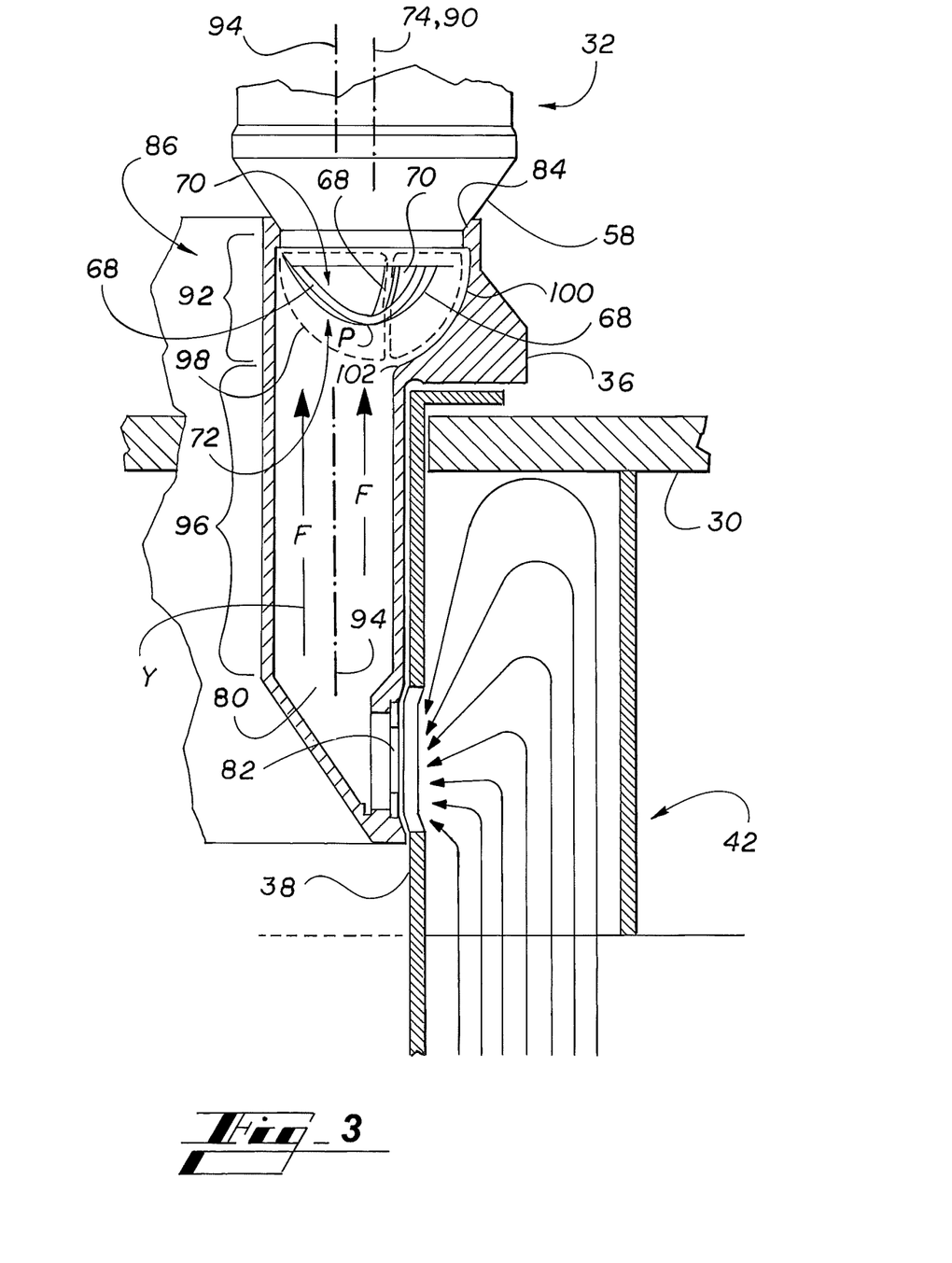
Figures 4, 5:
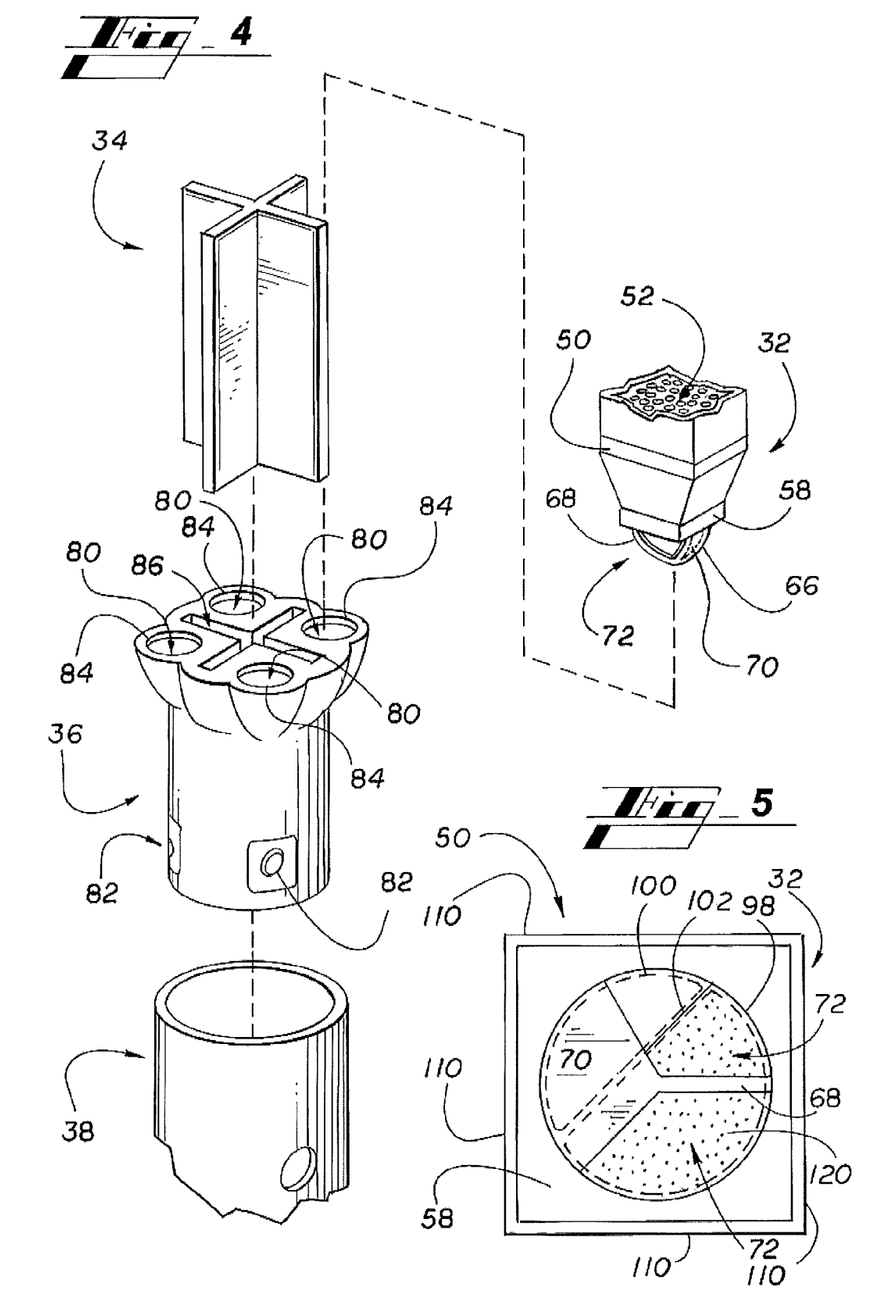
FIG. 4 is a partial exploded perspective view of the fuel assembly and fuel support member of FIGS. 2 and 3.
FIG. 5 is a schematic plan view of the fuel assembly and fuel support member of FIGS. 2 and 3.

The upper ends of the fuel assemblies 32 are supported by the top guide 26 and the lower ends of the fuel assemblies 32 are supported by the fuel support members 36. Referring to FIGS. 2-4, generally described, the fuel support member 36 is configured to support four fuel assemblies 32 in a lattice arrangement and to direct flow from the lower plenum 40 into the fuel assemblies 32. The fuel support member 36 is inserted into the upper end of the control rod guide tube 38 so as to be positioned at the upper end of the control rod guide tube 38.

FIGS. 2-5 illustrate one of the fuel assemblies 32 and the associated fuel support member 36, which are now described in further detail. Referring to FIG. 2, the fuel assembly 32 includes an assembly channel 50, fuel rods 52, fuel spacers 54, an upper tie plate 56, and a lower tie plate 58. The assembly channel 50 has an elongated shape with a square cross-section and upper and lower open ends in which the upper tie plate 56 and lower tie plate 58 are received. The fuel rods 52 are arranged in parallel and contain fissionable material. The fuel spacers 54 support the fuel rods 52 at several positions along the length of the assembly channel 50. The upper and lower tie plates 56, 58 secure upper and lower ends of the fuel rods 52 so that the coolant can pass therethrough.

Continuing with FIG. 2, the lower tie plate 58 includes an inlet nozzle 60 that leads to an enlarged volume 62 within the lower tie plate 58. The lower tie plate 58 further includes a rod supporting grid 64 that is located at an upper end of the enlarged volume 62 and houses ends of the fuel rods 52. The rod supporting grid 64 directs the flow of coolant from the enlarged volume 62 into the fuel assemblies 32 between the fuel rods 52.

The lower tie plate 58 further includes a coupling that includes a bail 66, which extends out from the inlet nozzle 60. Generally, the bail 66 is used as a handle that is configured to facilitate directing the lower end of the fuel assembly 32 so as to be received by the fuel support members 36. Here, the bail 66 includes three curved bars 68 spaced approximately 120 degrees apart and that converge at a point P. The pointed or conical shape of the bail 66 facilitates receiving and maintaining the bail 66 into a fuel support member 36. Further, referring to FIGS. 8 and 9, the bail 66 is configured to modulate flow F. Referring to FIGS. 3 and 5, to modulate flow F, the bail 66 includes a damper 70 and a port 72 the port 72 essentially being defined as an opening formed in the bail 66. The exemplary damper 70 is formed by closing in the space between two of the curved bars 68 that define the bail 66. The port 72 is defined by the other two spaces between the curved bars 68, so only about a third of the exemplary bail 66 is enclosed by the damper 70, although other damper/port ratios are foreseeable, as discussed below. Referring momentarily to FIGS. 5-9, as will be described in further detail below, the damper 70 and port 72 are configured so as to be alternatively positioned as a function of a rotational position of the fuel assembly 32 relative to the fuel support members 36 (for example, relative to a lower side entry orifice 82 described in further detail below). The port 72 is offset or asymmetrical with respect to a longitudinal axis 74 of the fuel assembly.

In alternative embodiments, the damper 70 spans two of the spaces between curved bars 68 and the port 72 is the other space between two of the curved bars 68. In alternative embodiments the port and damper can be alternatively configured. For example, a bail can have different numbers of bars with different spaces between bars selected to define the port and the damper, or the bail may be a structure without bars. Further, a structure separate from the bail can define the port and the damper.

Continuing with FIGS. 2-4, the fuel support member 36 includes four support channels 80 that are configured to direct flow F from the lower plenum 40 into the fuel assemblies 32. The fuel support member 36 also includes a control rod insertion slot 86 that is centrally positioned between the support channels 80. The control rod insertion slot 86 is configured to receive the control rod 34, which is positioned in between the lattice arrangement of fuel assemblies 32.

Each support channel 80 leads from a lower side entry orifice 82 that is configured to be positioned in the lower plenum 40 to a lower tie plate (LTP) seating orifice 84 that is configured to receive, support, and interface with the bail 66 and inlet nozzle 60 of the fuel assembly 32. The support channel 80 includes a substantially vertical portion 96 and a conical portion 92 adjacent the seating orifice 84. The conical portion 92 tapers outwardly and has a bowl-shaped, concave geometry that corresponds to conical shape of the bail 66. The conical portion 92 expands asymmetrically with respect to a center axis 94 of the substantially vertical portion 96 of the support channel 80 and includes an axially aligned area 98 and an offset area 100, which in the exemplary embodiment is curved to approximately the same extent as the bail 66. The aligned area 98 is substantially aligned with the vertical portion 96 and the offset area 100 is completely offset from the vertical portion 96. An edge 102 represents a division between the aligned area 98 and the offset area 100. A center axis 90 of the conical portion 92 is offset from the center axis 94 of the substantially vertical portion 96.

When the lower tie plate 58 is received in the support channel 80, the bail 66 extends into the conical portion 92 of the support channel 80 through the seating orifice 84 and is adjacent to the wall of the support channel 80 in the offset area 100 of the conical portion 92. The outer surface of the lower tie plate 58 seals against a lip of the seating orifice 84. As such, the support channel 80, the lower tie plate 58, and the assembly channel 50 provide a substantially continuous flow channel.

When the fuel assembly 32 is supported by the fuel support member 36, the longitudinal axis 74 of the fuel assembly 32 is aligned with the center axis 90 of the conical portion 92. The axes 74, 90 are offset from the center axis 94 of the substantially vertical portion 96 of the support channels 80.

Figure 7:
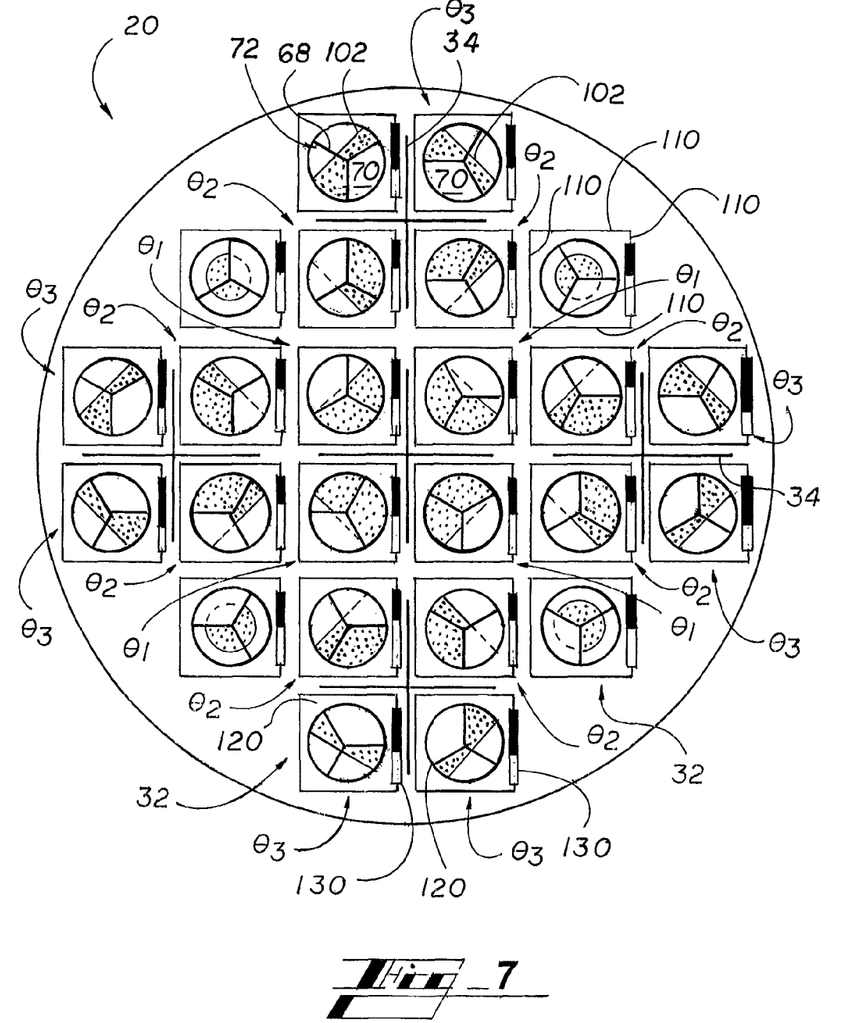
FIG. 7 is a schematic plan view of an arrangement of fuel assemblies and fuel support members of the reactor pressure vessel of FIG. 1, incorporating exemplary dampers for achieving variable orificing by rotating the fuel assemblies in accordance with one embodiment of the invention.
Figures 8, 9:
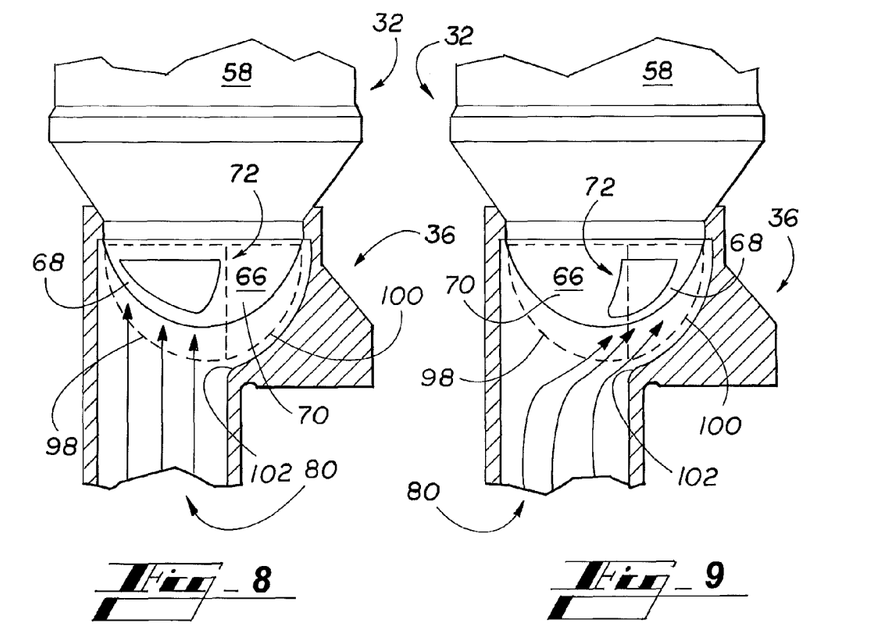
FIGS. 8 and 9 are partial cross-sectional elevation views of configurations of the fuel assembly and the fuel support of FIGS. 2 and 3, incorporating an embodiment of the invention.

Referring to FIGS. 4, 5, and 7, each of the fuel assemblies 32 has a substantially square cross-section represented by four walls 110 of the assembly channel 50. The fuel support member 36 and the control rod 34 position the fuel assemblies 32 adjacent one another in a lattice arrangement. Each fuel assembly 32 is oriented in one of four rotational positions θ1, θ2, θ3, θ4 (various rotational positions shown in FIG. 7) relative to the control rod 34. Each rotational position places a different pair of walls 110 adjacent to the control rod 34. Each rotational position also positions the port 72 differently with respect to the lower side entry inlet orifice 82 and provides different flow geometry 120. Referring to FIGS. 5 and 7, for purposes of teaching, flow geometry 120 is represented by the overlap between the port 72 and the substantially vertical portion 96 of the support channel 80 (and the substantially aligned area 98 of the conical portion 92). The overlap area is shown with a stipple pattern to represent flow geometry 120. Flow geometry 120 includes the geometry of the support channel 80, the geometry of the bail 66, and the position of the port 72, among other things.

Referring to FIG. 7, for purposes of teaching, rotational positions θ1, θ2 θ3, θ4 are described with respect to the structure of an associated support channel 80 (specifically, side entry inlet orifice 82 which is positioned opposite the intersection of the control rod 34). Each of the fuel assemblies 32 can have the same rotational position with respect to an associated side entry inlet orifice 82 of a support channel 80. For example, center fuel assemblies 32 have a rotational position θ1 such that the fuel assemblies 32 have the same flow geometry 120. As such, flow F is directed through each port 72 in substantially the same way and each associated fuel assembly 32 and fuel support member 36 has substantially the same loss coefficient.

Referring to FIG. 7-10, certain fuel assemblies 32 have different rotational positions θ1, θ2, θ3, θ4 with respect to an associated side entry orifice 82 of a respective support channel 80. Here, various ports 72 overlap to different degrees with the aligned area 98 and the offset area 100, providing different flow geometries 120 that direct the flow F differently. For example, referring to FIGS. 8 and 9, according to one rotational position θ1 a port 72 directs flow through the aligned area 98 and according to another rotational position θ2, θ3, θ4 the port 72 alternatively diverts greater flow F through the offset area 100.

Figure 10:
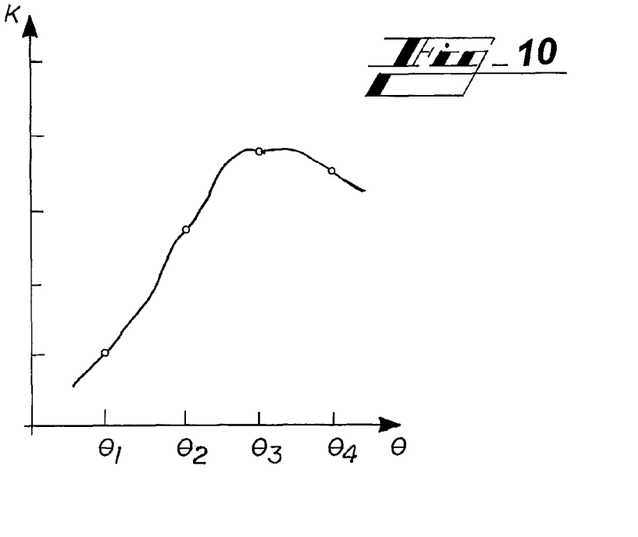
FIG. 10 is a graphical illustration of effect of damper position on loss coefficients associated with configurations of FIG. 7.

Referring to FIG. 10, a loss coefficient K through the fuel support member 36 and lower tie plate 58 is a function of the flow geometry 120 of the support channel 80, the bail 66, and the position of the port 72, among other things. In general, the less obstructed and more linear the flow, the lower the loss coefficient K. The interaction of the flow geometry 120 of the support channel 80 and the structure of the bail 66 impacts the loss coefficient K. The loss coefficient K is a function of the rotational position of the fuel assembly 32 because rotation of the fuel assembly 32 changes the position of the damper 70 and the port 72. Referring to FIG. 10, inlet loss coefficients K associated with four rotational positions θ1, θ2, θ3, θ4 are illustrated. An inlet loss coefficient K can be determined according to the following relationship:

$$K \propto \frac{\Delta}{Q^2}$$

where Δ is the pressure loss due to local losses from the lower plenum 40 through the rod supporting grid 64 and Q is the flow rate entering the lower tie plate 58.

In general, the different positions of the port 72 result in different flow F paths through the fuel support member 36 and lower tie plate 58. In the illustrated arrangement, a primary flow path Y is offset from the center axis 94 of the substantially vertical portion 96 and along the inside of the support channel 80, opposite the side entry inlet orifice 82. Flow geometry 120 that allows the flow Y to follow the primary flow path Y (e.g., port 72 aligned with the aligned area 98 in FIG. 8) generally results in lower loss and flow geometry 120 than directing the flow Y along an alternate flow path (e.g., damper 70 aligned with the aligned area 98 in FIG. 9) generally results in higher loss.

Figure 6:
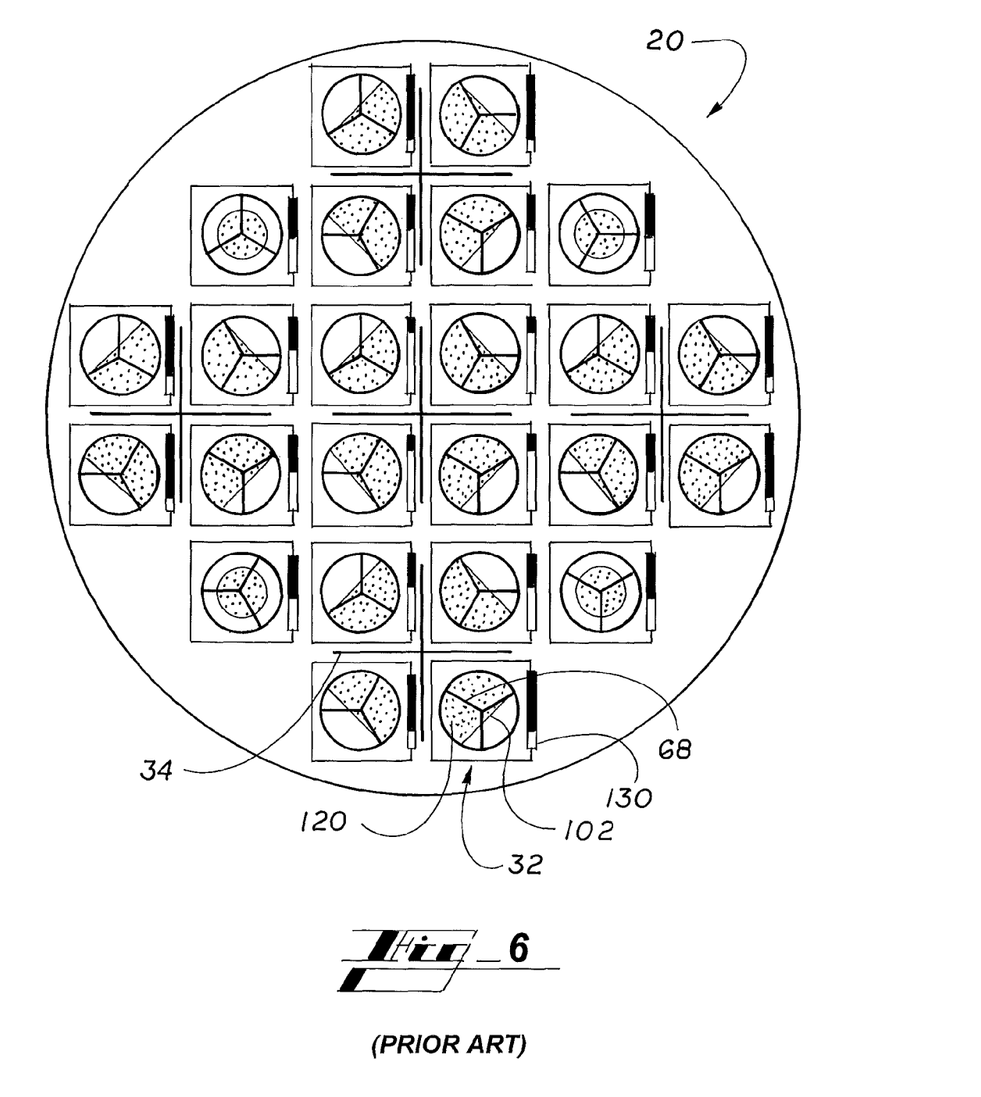
FIG. 6 is a schematic plan view of an arrangement, in a reactor pressure vessel, of fuel assemblies and fuel support members that lack variable orificing in accordance with the prior art.

For a rotational position where the port 72 is substantially aligned with the primary flow path (referred to as an "open" position), the flow F is relatively unobstructed and can have a loss coefficient that is comparable to a bail 66 without a closed portion 70 (see, e.g., FIG. 6 illustrating bails without closed portions and see FIG. 7, at center, illustrating bails in an open position). Here, the flow F can substantially follow the primary flow path with less loss and the port 72 is positioned in the aligned area 98. For a rotational position where the damper 70 is at least partially aligned with the primary flow path Y, the flow F is obstructed by the damper 70 and diverted into the offset area 100. Here, the flow F has a less direct path with greater loss coefficient. Accordingly, the combination of the selective rotational positioning of the bail 66 and the intentional misalignment of the bail 66 with vertical portion 96 of the support channel 80 adjustably restricts flow.

Referring to FIGS. 6 and 7, an exemplary method of rotating fuel assemblies 32 to customize inlet loss coefficients K is described. FIGS. 6 and 7 schematically illustrate an exaggerated cross-sectional view of a BWR 10 core (with an unrealistically small number of fuel assemblies 32) showing the support channels 80, lower tie plates 58 of fuel assemblies 32, and control rods 34. The stippled areas represent the flow geometry 120 through the lower tie plate 58. Relative bundle exit quality levels 130 are shown as a schematic (not to scale) on the right side of each fuel assembly 32. The relationship between loss coefficient and both MCPR and exit quality is described in further detail below.

Typically, there are two types of fuel assemblies 32 that are at very low power throughout the cycle: those that are on the periphery of the reactor pressure vessel 20 and those that are in a control cell in accordance with a known or yet to be developed BWR core design techniques, such as a control cell core (CCC) strategy. The periphery of the reactor pressure vessel 20 has significant neutron leakage, and as such, fuel assemblies 32 located here have lower power than those at the center of the reactor pressure vessel 20. A control cell embodies a CCC operational strategy in which high exposure fuel assemblies 32 (those that have resided in the reactor for a long time) are placed adjacent to a control rod 34 that is in the inserted position for most of the cycle. By design, these fuel assemblies 32 have low power throughout the cycle.

Additionally, fuel assembly 32 power has a strong dependence on exposure (defined as fuel assembly power integrated with residence time). High exposure fuel assemblies 32 generally have lower power than "fresh," or low exposure, fuel assemblies 32 due to the reduction of the uranium-233 and uranium-235 concentrations present in the fuel assembly 32 from fission reactions.

There are many advantages to using customized inlet loss coefficients K in the design and operation of boiling water reactor 10. A first is an increase in the exit quality of low power fuel assemblies, with a corresponding decrease in the exit quality of high power fuel assemblies. A second is an increase in the MCPR for high power fuel assemblies with a corresponding decrease in the MCPR for low power fuel assemblies. These two goals are interrelated and complementary, that is, a decrease in exit quality will result in an increase in MCPR.

There are other secondary effects to the implementation of customized inlet loss coefficients K. Some of the more important secondary effects may include the following. The flow quality in the fuel assembly impacts the neutronics of the fission reaction and thus axial power generation. As such, the nuclear operation of any fuel assembly 32 may be improved or optimized through flow quality customization via the inlet loss coefficient K. A change in flow Y can change the axial power distribution in the fuel assembly 32 as well as the total bundle power. A change in the flow Y can thus be used to impact fuel assembly 32 parameters of interest, such as linear heat generation rate, as well as core-wide parameters of interest, such as core-wide axial and radial power profiles. A change in flow Y can also be used to impact the neutron spectrum and thus the generation and fissioning of plutonium.

As mentioned above, for purposes of comparison, FIG. 6 illustrates a boiling water reactor 10 where the lower tie plates 58 are without flow control structure (e.g., dampers 70) such that the flow geometry 120 and flow path through the peripheral fuel bundles 32 is substantially the same as the flow geometry 120 and flow path through the central fuel bundles 32. Here, the peripheral bundles 32 have very low exit qualities 130 while the central bundles 32 have very high exit qualities 130.

FIG. 7 illustrates a boiling water reactor 10 where lower tie plates 58 include dampers 70 and the fuel bundles 32 are configured to customize inlet loss coefficients K according to an exemplary method. Here, the peripheral bundles 32 are rotationally positioned θ3 to have flow geometry 120 that is least aligned with the primary flow path Y and the central bundles 32 are rotationally positioned θ1 to have flow geometry 120 that is most aligned with the primary flow path Y. As a result, the exit quality 130 of the boiling water reactor 10 is more evenly distributed. The peripheral bundles 32 have exit qualities 130 that are similar to those of the central bundles 32.

Rotating peripheral fuel bundles 32 such that the flow geometry 120 creates a flow path that is different from the primary flow path Y increases the inlet loss coefficient K of low power (e.g., peripheral) fuel assemblies 32. Rotating central fuel bundles 32 such that the flow geometry 120 creates a flow path that is substantially that of the primary flow path Y and leaves the inlet loss coefficient K of high power (e.g., central) fuel assemblies 32 essentially unchanged. This results in throttled flow for low power fuel assemblies 32, increased system pressure drop across all fuel assemblies 32, and reduced core flow rate Q to some degree. The increase in the system pressure drop across the fuel assemblies will increase flow to all non-throttled (i.e., high power) fuel assemblies 32.

In certain embodiments, this method of rotating fuel assemblies 32 is applied once per fuel cycle. During the process of shuffling fuel assemblies 32 to different locations or loading new fuel assemblies, the rotational position A of each fuel assembly 32 is selected without the need to spend additional time to insert the fuel assembly 32. As such, fuel assemblies 32 that are selected to be throttled (e.g., reduced flow) will generally be operating at a low power throughout the cycle.

Figure 11:
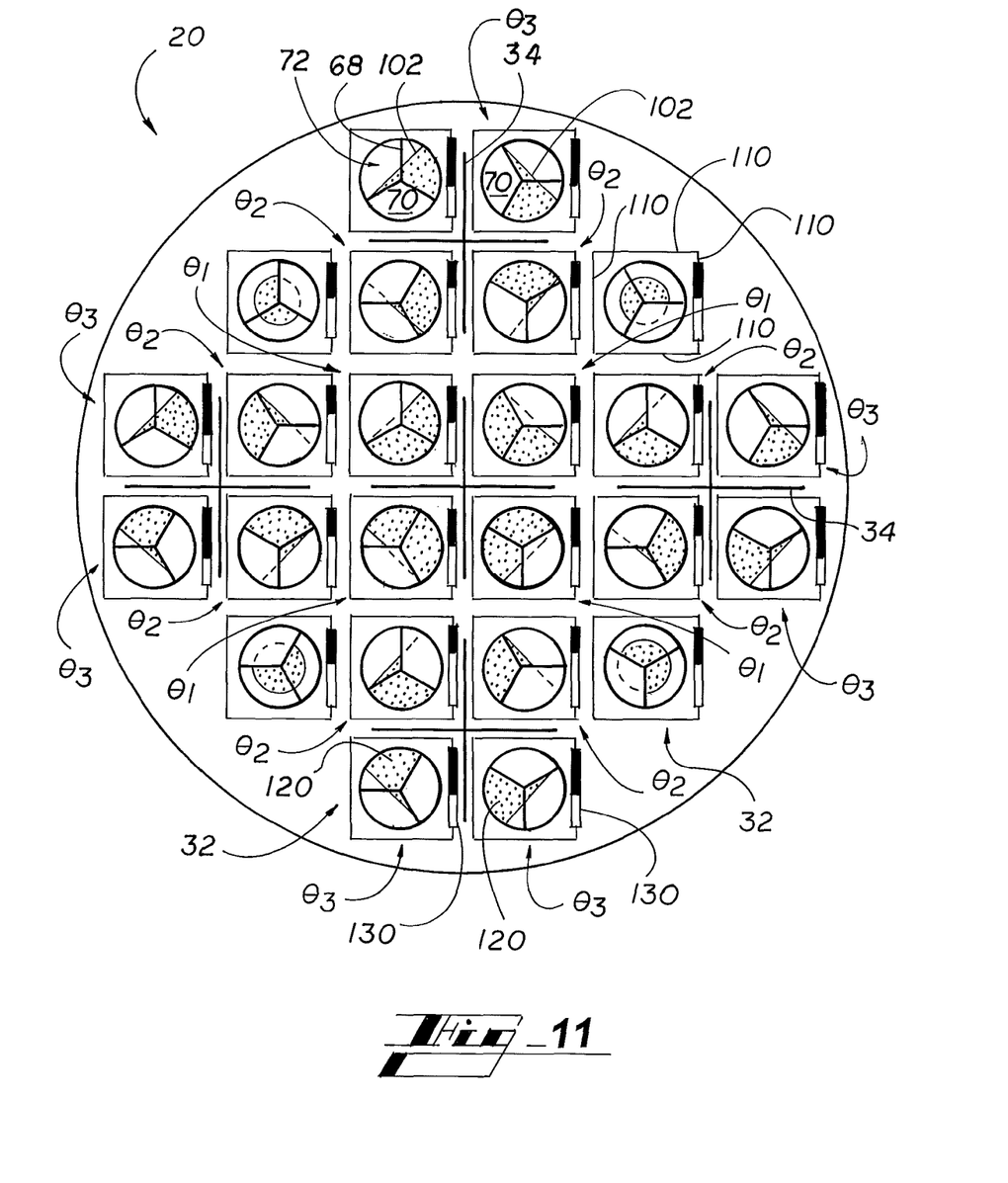
FIG. 11 shows a schematic plan view of another arrangement of fuel assemblies and fuel support members of the reactor pressure vessel of FIG. 1, incorporating exemplary dampers for achieving variable orificing by rotating the dampers without rotating the fuel assemblies, according to an alternative embodiment of the invention.

Although damper actuation has been described in the context of rotating the fuel assemblies, it is contemplated that damper actuation can occur by rotating the dampers independently of the fuel assemblies. Additionally, it is contemplated that different fuel assemblies may have dampers of varying sizes, shapes, orientations, and rotation positions. Either of these scenarios can yield even more custom core flow patterns, as shown in FIG. 11.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lower tie plate, comprising:
    an inlet nozzle; and
    a flow-directing structure that extends over the inlet nozzle, the flow-directing structure comprising:
        a closed surface that defines a damper that is configured to obstruct flow through the inlet nozzle; and
        an opening in the flow-directing structure that is configured to allow flow through the flow directing structure and into the inlet nozzle, wherein the opening is asymmetrical with respect to a longitudinal axis of the lower tie plate;
    wherein the lower tie plate is configured to be:
        positioned at a lower end of a fuel assembly; and
        at least partially received in a seating orifice of a fuel support member;
    wherein each of the closed surface and the opening are configured to be positioned in the seating orifice of the fuel support member when the lower tie plate is at least partially received in the seating orifice of the fuel support member; and
    wherein each of the closed surface and the opening has a rotational position in the seating orifice of the fuel support member, wherein the rotational position is based on rotation of the flow directing structure:
        around the longitudinal axis; and
        relative to the seating orifice of the fuel support member.

2. The lower tie plate of claim 1, wherein the flow-directing structure is configured to rotate with rotation of the fuel assembly such that rotation of the fuel assembly is rotation of the flow-directing structure about the longitudinal axis.

3. The lower tie plate of claim 1, the flow-directing structure further comprising a bail.

4. The lower tie plate of claim 1, wherein the closed surface and the opening are each offset with respect to a longitudinal axis of the lower tie plate.

5. The lower tie plate of claim 4, wherein the closed surface is configured to divert flow from a linear flow path through the lower tie plate.

6. The lower tie plate of claim 1, wherein the closed surface is configured to obstruct flow through the inlet nozzle and into the fuel assembly.

7. The lower tie plate of claim 1, wherein the flow-directing structure is configured to be rotated independently of a body of the lower tie plate.

8. The lower tie plate of claim 1, wherein the flow-directing structure is configured to be received within the seating orifice of the fuel support member to couple the inlet nozzle to a channel of the fuel support member.

9. The lower tie plate of claim 1, wherein the inlet nozzle includes an opening to an enlarged volume within the lower tie plate.

10. The lower tie plate of claim 9, comprising a rod supporting grid that is located at an upper end of the enlarged volume, wherein the rod supporting grid is configured to house ends of fuel rods and to direct a flow of coolant from the enlarged volume into the fuel assembly and between the fuel rods.

11. The lower tie plate of claim 1, wherein the flow-directing structure includes a bail that is configured to facilitate directing a lower end of the lower tie plate so as to be received by the seating orifice of the fuel support member.

12. The lower tie plate of claim 1, wherein the flow-directing structure has a shape with a concave surface.

13. The lower tie plate of claim 1, wherein a ratio of a size of the closed surface to a size of the opening is at least one to two.

* * * * *